March 13, 1956    C. W. CHRISTIANSEN    2,737,726
PITCHOMETER

Filed Oct. 8, 1952        3 Sheets-Sheet 1

INVENTOR
CHARLES W. CHRISTIANSEN
BY
ATTORNEY

March 13, 1956 C. W. CHRISTIANSEN 2,737,726
PITCHOMETER
Filed Oct. 8, 1952 3 Sheets-Sheet 2
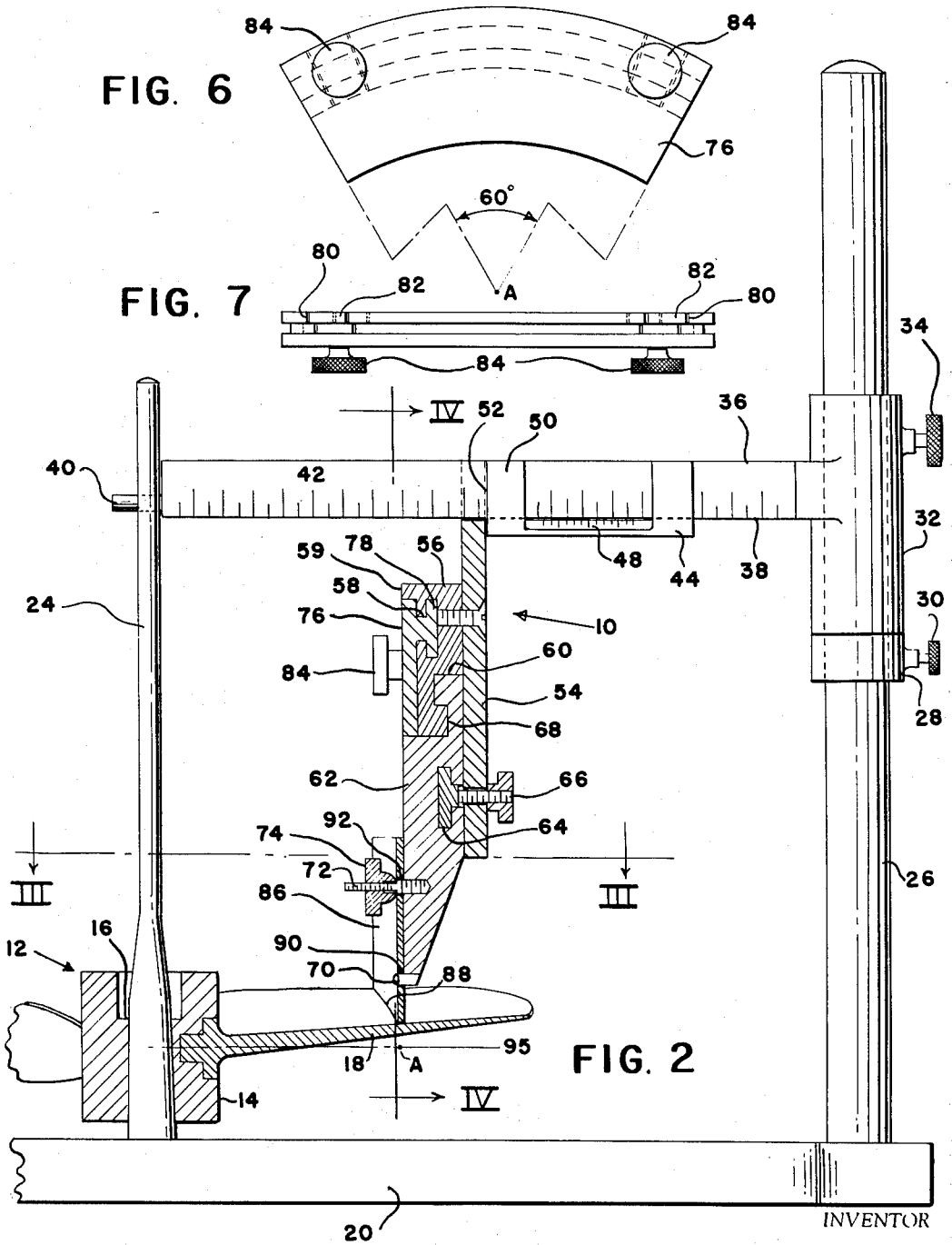
INVENTOR
CHARLES W. CHRISTIANSEN
BY George Sipkin
B. L. Zanguill
ATTORNEY March 13, 1956   C. W. CHRISTIANSEN   2,737,726
PITCHOMETER
Filed Oct. 8, 1952   3 Sheets-Sheet 3
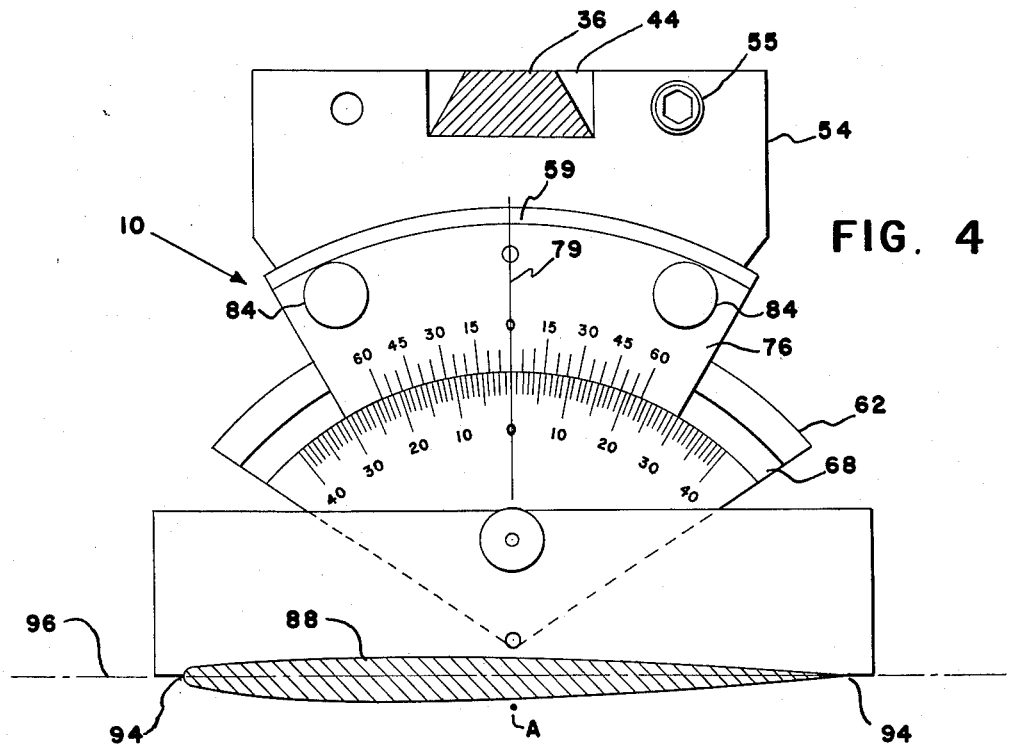
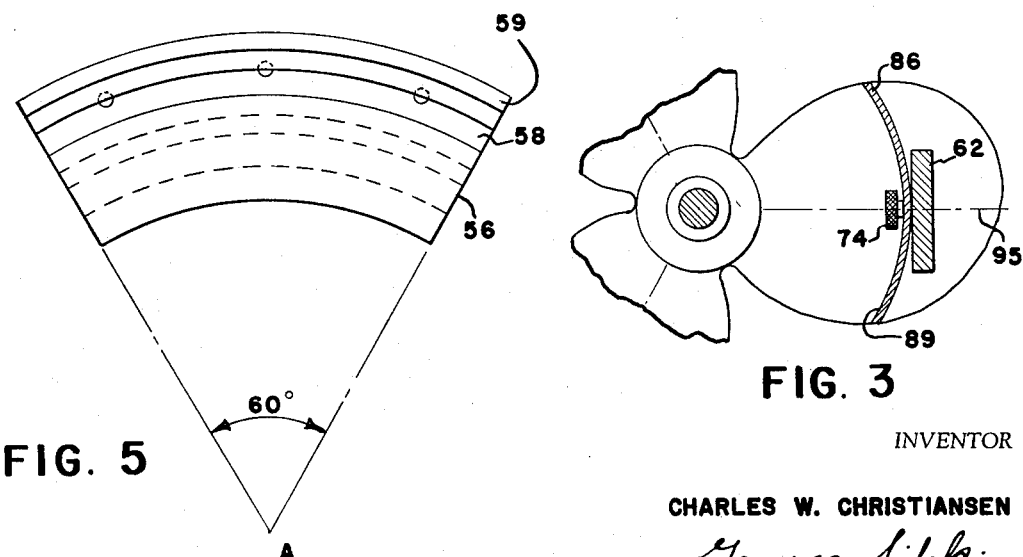
INVENTOR
CHARLES W. CHRISTIANSEN
BY George Sipkin
B. L. Zangwill
ATTORNEY United States Patent Office 2,737,726
Patented Mar. 13, 1956

2,737,726

PITCHOMETER

Charles W. Christiansen, Mount Rainier, Md.

Application October 8, 1952, Serial No. 313,813

7 Claims. (Cl. 33—174)

(Granted under Title 35, U. S. Code (1952), sec. 266)

The invention described herein may be manufactured and used by or for the Government of the United States of America for governmental purposes without the payment of any royalties thereon or therefor.

The present invention relates to pitchometers and more particularly to instruments for determining the relative location, contours, and true angular inclination of propeller blade sections.

In general, former pitchometers have comprised a pintle mounted in parallelism with the axis of the propeller being gauged or coinciding with such axis, a protractor or equivalent structure adjustably mounted upon and coacting with the pintle to indicate the angular inclination or pitch of the propeller blade and intended to be operative in a plane parallel to the pintle, and a plurality of contact points upon the lower edge of the protractor to coact with the propeller blade along definite sections of the blade radius to determine if the angular inclination at such sections corresponded to that required by the particular propeller's design data and if the blade contour was accurate at a given radius.

Due to the rotation of the protractor about a pivot axis which is always on a transverse plane passing through the plurality of contact points on the lower edge of the protractor and due to the contact points coacting with a curved or cambered propeller blade surface at points displaced from the pitch line of the propeller blade, the angular movement of the protractor away from the horizontal caused the protractor to rotate about an axis which differed from the axis of rotation of the propeller blade in a controllable pitch propeller or from the corresponding generatrix base point in a fixed pitch propeller and thereby caused the protractor's contact points to shift over the curved surface of the propeller blade so as to continuously vary the relationship of the pitch line of the protractor with respect to the pitch line of the propeller blade. Any variations between the protractor's pitch line, which is always on the transverse plane passing through the contact points, and the propeller blade's pitch line caused an error in the measurements because the protractor recorded the angular inclination of its own pitch line and not that of the propeller blade's pitch line. This error becomes critical in screw propellers where a plurality of blades with cambered surfaces are utilized and each blade must coincide in form and angular inclination with the other blades to avoid troublesome vibration and critical stresses arising from discrepancies between the blades due to improper gauging of one blade with the others. For example, if one blade generated more thrust than the others, it will produce vibrational disturbances that will injure the propeller shaft and rupture the propeller blades.

An object of the present invention is to provide a pitchometer wherein these errors are eliminated, and to provide a simple and reliable instrument to measure the pitch of curved or irregularly faced propeller blades, so that the pitch line of the protractor will coincide with the pitch line of the propeller blade, and hence, so that the pivot axis of the protractor may coincide with the axis of rotation of the propeller blade in a controllable pitch propeller or with the corresponding generatrix base line projection in a fixed pitch propeller and so that the protractor may indicate the true pitch and contours of the propeller blade at known locations.

With the above and other objects in view, the invention may be illustratively embodied in a pitchometer comprising a base, means on the base to support a screw propeller to be measured on the base, second means on the base to adjustably support a measuring member, a blade-contour shaped member to be applied to a blade of the screw propeller at a known radius, and means to support the blade-contour shaped member in measuring position and in predetermined angular inclination on the measuring member.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 2 is a side view, partly in section, of the apparatus shown in Fig. 1;

Fig. 3 is a view of a horizontal section of the apparatus taken on line III—III of Fig. 2 looking in the direction of the arrows;

Fig. 4 is a view of a vertical section of the apparatus taken on line IV—IV of Fig. 2 looking in the direction of the arrows;

Fig. 5 is a front view of a part of the showing of Fig. 2;

Fig. 6 is a front view of a part of the showing of Fig. 2; and

Fig. 7 is a plan view of a part of the showing of Fig. 6.

Figure 1:
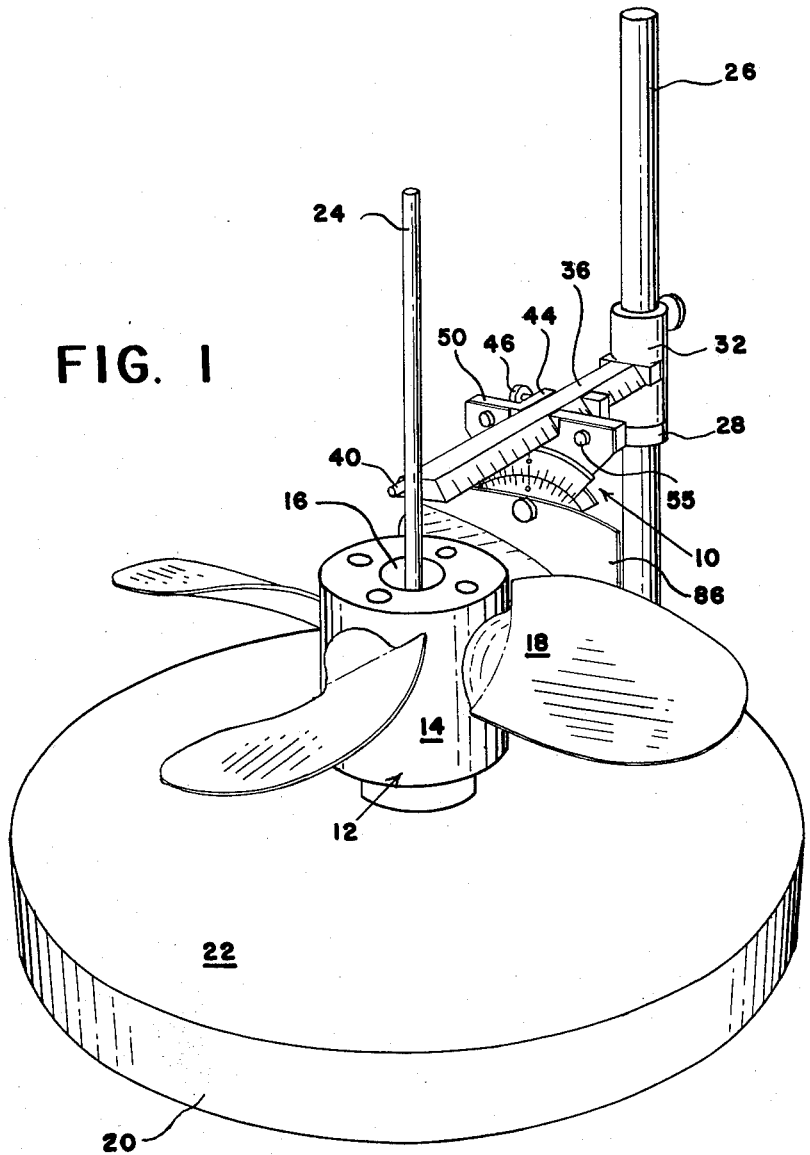
Fig. 1 is a perspective view of a preferred embodiment of the invention.

Referring now to the drawings, wherein like reference characters designate like or corresponding parts throughout the several views, there is shown in Fig. 1 a preferred embodiment of the invention, as in use, generally indicated at 10, which is to measure the contour and angular inclination of the blades of the illustrated propeller, generally indicated at 12, which has a hub 14 formed with a downward wideningly tapered axial bore 16, and four, preferably identical, adjustable, radially disposed blades 18. The four blades being identical in form, a description of any one of them applies to any of the other three. The upper and lower surface of each blade is curved and the blade is twistable so as to produce a variable pitch propeller. Each blade is mounted in the hub 14 so that the pitch of the blades may be adjusted and and re-set as deemed desirable.

The apparatus embodying the invention shown in Figs. 1 and 2, comprises a rigid base 20 having a perfectly flat and horizontal surface 22, the base 20 having suitable supporting means, not shown, therefor. A vertical shaft 24 is fixedly mounted in the base at right angles to the surface 22 and has its lower portion tapered to accurately fit the tapered axial bore 16 of the propeller 12 and thus to support the propeller at exactly a right angle to the surface 22.

There is also provided a second vertical shaft 26 rigidly secured in the base 20 having its axis parallel to the axis of the shaft 24, and both vertical shafts are so spaced that the distance between them is greater than the radius of any propeller to be measured in the illustrated embodiment of the invention. The shaft 26 is of constant diameter and has slidably mounted thereon a removable limit collar 28, the limit collar having an integral locking mechanism 30 to securely lock the limit collar at any predetermined location along the vertical shaft 26. A large support sleeve 32 is slidably fitted down over the shaft 26 to be supported on the limit collar 28 and is adapted to be rotatable about the shaft without looseness of ill-fit. A locking mechanism 34 integral with the support sleeve can effectively releasably lock the sleeve 32 to the shaft 26.

At about mid-length of the support sleeve 32, a horizontally extending radius arm 36 is integrally secured thereon. The arm 36 is adapted to be angularly adjustable about the shaft 26 with the sleeve 32, as in the preferred embodiment, or may be angularly adjustable about the propeller shaft; and this arm is formed along its under side with a radial male dovetail 38. The extended end of the radius arm 36 is adapted to contact the vertical shaft 24 through a radially extending aligning pin 40 which is integrally secured to the end of the radius arm.

The radius arm 36 bears on one of its side faces a scale 42 whose zero point is the axis of the vertical shaft 24, and which is graduated with a linear measure that indicates radial position from the axis of the shaft 24.

A supporting member generally indicated at 44 is formed with a female dovetail to engage the male dovetail 38 on the radius arm 36 and slide without looseness but freely thereon. The supporting member 44 has a depending locking screw 46 that is utilized in the linear adjustment and securing of member 44 on the radius arm 36. A side of the supporting member 44 is formed with a U-shaped cut-out section, as shown, having a vernier surface 48 to cooperate with the scale 42 on the radius arm 36, and thereby accurately to permit the radial adjustment of the supporting member 44 on radius arm 36. The supporting member is formed with the end nearest the aligning pin 40 extending in a horizontal direction perpendicular to the radius arm 36 to form a mounting bracket 50 having a mounting face 52.

A vertical supporting member 54 is fixedly secured to the mounting face 52 by screws 55, or similar securing means, so that the vertical supporting member is accurately perpendicular to the radius arm 36. An arcuate guide piece 56 is rigidly mounted, by screws or the like, on the side of the vertical supporting member facing away from the mounting bracket 50 and is formed with an outer T-shaped guiding slot 58 with an outer flange 59 and an inner guiding slot 60. The guiding slots 58 and 60 having radii with a common center A, as shown in Fig. 4. A protractor sector 62 is adapted to cooperate with members 54 and 56 through a T-shaped guiding slot 64 coacting with a protractor locking mechanism 66 which projects from member 54 and adjustably secured thereto and through a guiding slot 68 complementing and coacting with the inner guiding slot 60 of member 56. The slots 64 and 68 have radii with a common center that coincides with point A. On the side facing away from the supporting member 54, the sector 62 is formed with a template pin 70 at the apex of the protractor sector located at a predetermined distance above point A, and with an integral securing pin 72 having a cooperating nut 74. The sector 62 is graduated with an arcuate scale positioned near the edge of the guiding slot 68. This scale is adapted to be matched as hereinafter described with a vernier member 76, and is graduated both ways from a central zero in angular degrees, as shown.

The vernier member 76 is formed with a rearwardly projecting T-shaped arcuate flange 78 to slidably fit within the guiding slot 58 for coaction therewith and graduated both ways from a central zero in angular minutes, as shown; so that the central zero of the member 76 is accurately in a vertical plane with the central zero of the protractor sector 62. Also, a line 79 is inscribed on the faces of members 62 and 76 connecting the central zero and extended across the outer flange 59 of member 56, as shown. The T-shaped arcuate flange 78 is formed with two cut-out portions 80 for T-shaped vernier locking mechanism 82 with adjusting screw 84, to adjustably lock the vernier member to guide piece 56; also, the center of the radius of the arcuate flange 78 coincides with point A. A contour template 86 with a built-in design blade angle and originally used in the manufacture of the blade 18 is formed with a lower edge 88 conforming to the upper curved surface of the blade 18 at a known blade radius and formed with an outer face 89 cylindrically curved to the known radius of the blade from the axis of the shaft 24. The member 86 has a first aperture 90 adapted to engage the template pin 70 and a second aperture 92 adapted to engage the securing pin 72. The nut 74 coacts with the pin 72 to firmly secure the template 86 to the protractor sector 62. As noted above, the lower edge 88 conforms to the blade 18 without any clearance when the various parts are assembled as shown. The template ends 94 are formed to coincide with the pitch line 96 of the blade section at the known radius being investigated. Point A, as the common center for all radii of members 56, 62, and 76, always lies on the axis of rotation of the blade section at the known radii and always lies on a generatrix base line projection 95.

In a controllable pitch propeller, as in the preferred embodiment, the generatrix base line projection 95 is designed to coincide with the axis of rotation of the propeller blade. In a fixed pitch propeller, a generatrix base point projection lying on the generatrix base line projection 95, corresponds to point A in the preferred embodiment. This generatrix base point projection would be the common center for all radii of members 62, 76, and 86 in an embodiment utilizing the fixed pitch type propeller. Accordingly, in the controllable pitch propeller 12 the members 62, 76, and 86 rotate about point A which always lies on the axis of rotation of the blade 18 at known radii; and in effect, the center about which the above pitchometer members rotate is the axis of rotation of the blade 18. Consequently, any change in the angular inclination of the pitch line 96 of the blade 18 corresponds to an accurately equal change in the pitch line of the pitchometer.

In operation the propeller 12 to be gauged is placed in position on the shaft 24 as shown and adjusted rotatably until a blade 12 is approximately facing the shaft 26. The supporting sleeve 32 is unlocked from the shaft 26 by loosening the locking mechanism 34 until the supporting sleeve member rests on the limit collar 28. The sleeve 32 is adjusted rotatably so that the aligning pin 40 contacts the vertical shaft 24. The supporting member 44 is unlocked from the radius arm 36 by unloosening the locking screw 46 to linearly adjust the member 44 to a known blade radius, whereupon the screw 46 is tightened to secure the member 44 on the radius arm 36. The template 86, corresponding to the blade section and design blade angle at the known blade radius, is then placed on the protractor sector 62, so that the first aperture 90 snugly fits the template pin 70 and the second aperture 92 engages the securing pin 72. The nut 74 is threaded on pin 72 to firmly secure the template 86 to the protractor sector 62.

The template 86 having been thus set in position with respect to the protractor sector, the protractor sector 62 and the vernier member 76 are locked in position so that the line 79 is accurately aligned. The limit collar 28 is loosened through the integral locking mechanism 30, so that the lower edge of the template 86 is lowered to conform with the upper curved surface of the blade 18 without any clearances therebetween. The collar 28 and sleeve 32 are then non-rotatably secured to the vertical shaft 26 to maintain the accurate relationship of the blade 18 and the template 86.

It is to be noted that with the line 79 aligned and the lower edge of the template conforming with the upper surface of the blade, the axis of rotation of both the vernier member and the protractor sector coincides with the axis of rotation of the blade 18. In effect, the blade 18 is accordingly set at an angular inclination equal to the design blade angle of the template 86. However, if the lower edge of the template does not conform with the upper surface of the blade when the line 79 is aligned, the protractor sector 62 is loosened through the locking mechanism 66, and the sector 62 is arcuately adjusted until the template conforms with the upper surface of the blade 18. At this point, the displacement of the central zero of the sector 62 from the central zero of the vernier member 76 indicates the error in the pitch setting of the blade. Accordingly, the blade 18 may be rotated until the line 79 is accurately aligned to indicate the proper pitch setting of the blade at a known radius. In like manner, all the blades of propeller 12 may be measured for determining the location, contours, and true angular inclination at known radii.

In like manner, the pitch setting of the blades 18 may be changed from the design blade angle built in the template 86 by simply setting on the protractor sector 62 the addition or subtraction to the design blade angle and, since the blade and protractor sector rotate on a mutual axis, the pitch of the blade will change according to the setting of the protractor sector 62.

In cases where it is desirable to check the design blade angle built in the template 86, the propeller 12 is removed from the vertical shaft 24 and the locking mechanism 66 is loosened to release the protractor sector 62 so that both the template 86 and sector 62 may be rotated about their common center, point A. The mechanism 10 is then appropriately lowered so that the template ends 94 are resting on the surface 22. At this point, the built-in design blade angle is indicated by the angular measurement on the sector 62 aligned with the central zero of the vernier member 76; and in the case of an existing discrepancy in the template built-in blade angle with the actual design blade angle, the discrepancy is corrected before further gauging of the propeller 12 is attempted.

After the template built-in blade angle has been found to be equal to the actual design blade angle, the adjusting screws 84 are loosened to release the vernier member 76 and to align the central zero on the member 76 with the angular measurement on the sector 62. The screws 84 are then adjusted to lock the member 76 so that in the further gauging of the propeller 12, the central zero of the vernier member will indicate the actual blade angle in the blade 18 or the blade angle to be placed therein.

The present invention provides a pitchometer wherein the contour and pitch of curved or irregularly faced propeller blades at a known radius are measured by using the templates originally utilized in the manufacture of the blades, and further provides adjustable and graduated supporting measuring means for the templates to rotate about an axis coinciding with the axis of rotation of the blade of a controllable pitch propeller or about an axis coinciding with the generatrix base line projection of a fixed pitch propeller.

In this manner, the pitch line of the blade at a known radius will coincide with the pitch line of both the template and supporting measuring means and thereby eliminate errors in the measuring of the actual blade angle and surface contour at a known radius.

Various modifications are contemplated and may obviously be resorted to by those skilled in the art without departing from the spirit and scope of the invention, as hereinafter defined by the appended claims, as only a preferred embodiment thereof has been disclosed. For example, the present invention may be utilized directly on the propeller shaft of a vessel in dry-dock, whereby the contour and pitch of the propeller blades at known radii may be gauged without the necessity of removing the propeller blades from the propeller shaft. In this instant, the arm 36 of the present invention would be adjustably mounted on the propeller shaft.

What is claimed is:

1. A pitchometer adapted to determine contour characteristics of the blades of a propeller, said pitchometer having a base, first and second vertical shafts secured to said base, said first shaft having an axis adapted to coincide with the propeller axis, a horizontal member secured to said second shaft and operatively engageable with said first shaft, a template provided with an edge adapted to coincide with the transverse surface contour of a blade of the propeller at a known radius thereof, said template being rotatably secured to said horizontal member and having a pitch line adapted to completely coincide with the pitch line of the propeller blade at a known radius for any blade contour, the axis of rotation of said template being located on the generatrix base line projection of the propeller blade, whereby said template provides means for measuring the true pitch of the blade.

2. In a pitchometer, a first shaft having an axis adapted to coincide with the axis of adjustable pitch propeller to be measured, a second shaft radially spaced from said first shaft and parallel thereto, a horizontal radius arm adjustably secured to said second shaft and having an integral end pin operatively engaging said first shaft, protractor means rotatably mounted on said radius arm and parallel to said first and second shafts, a template rigidly secured to said protractor means and having a lower edge conforming to the curved surface of a propeller blade at a known radius, said template having a pitch line adapted to completely coincide with the pitch line of the propeller blade at the known radius for any blade contour, said protractor and template being adapted for rotation about the same axis as the adjustable pitch propeller blade, whereby said template and protractor may be used to determine the blade angle at said known radius.

3. In a pitchometer, a base support having a first vertical shaft and a second vertical shaft, said first vertical shaft having an axis adapted to coincide with the axis of a controllable pitch propeller to be measured, a horizontal support mounted on said second vertical shaft and having an integral alignment pin engaging said first shaft, angular measuring means adjustably mounted on said horizontal support and having a first rotatable scale means and a second rotatable scale means rotatably secured thereto, a blade template secured to said first rotatable scale means and having a lower edge conforming to a propeller blade surface of said propeller at a known radius, said first and second rotatable scale means rotating on a common center adapted to coincide with the axis of rotation of the propeller blade, said angular measuring means being independent of the propeller blade contour to thereby indicate the pitch of the propeller blade by the angular displacement of the first scale means relative to the second scale means.

4. In a pitchometer, a supporting shaft for a propeller to be measured, a vertical shaft parallel to said supporting shaft, a horizontal supporting members secured to said vertical shaft and operatively engaging said supporting shaft, an angular measuring member adjustably supported on said horizontal supporting member and comprising a vernier member and a protractor member rotatably secured thereto and being rotatable relative to one another, a blade template fixedly attached to said protractor member and having a lower edge conforming to the surface of the propeller blade at a known radius, said blade template having a pitch line adapted to completely coincide with the pitch line of the propeller blade at the known radius, the axis of rotation of said vernier, protractor and template being located on the generatrix base line projection of the propeller blade, whereby said template provides means for measuring the true pitch of a propeller blade.

5. In a pitchometer, a base having a vertical shaft and propeller supporting means adapted to coincide with the axis of a propeller to be measured, a graduated horizontal arm adjustably mounted on said vertical shaft and operatively engaging said propeller supporting means, a horizontal supporting member adjustably mounted on said horizontal arm, a vertical supporting member secured to said horizontal supporting member and having a guide piece mounted thereon, said guide piece having an inner guide slot and an outer guide slot, a vernier member having a rearwardly extending T-shaped flange coacting with said outer guide slot thereby adjustably mounting said vernier member on said guide piece, a protractor sector operatively connected to said vernier member and having a rear guide slot and a vertically extending flange coacting with said inner guide slot, said vertical supporting member having a locking member coacting with said rear guide slot whereby said protractor sector is adjustably locked on said vertical supporting member relative to said vernier member, a template conforming to the surface of the propeller blade at a known radius and secured to said protractor sector to rotate therewith.

6. The invention as defined in claim 5 but further characterized in that said vernier member and said protractor sector rotate about a common center relative to each other for indicating the true pitch of the propeller blade independently of the contour of the blade, said common center coinciding with the axis of rotation of the blade of the propeller.

7. In a pitchometer, a base support having a first vertical shaft and a second vertical shaft, said first vertical shaft having an axis adapted to coincide with the axis of a controllable pitch propeller to be measured, a horizontal support mounted on said second vertical shaft and having means thereon adapted to movably engage said first shaft, angular measuring means adjustably mounted on said horizontal support and having a first rotatable scale means, and a second scale means both of which are secured thereto, a blade template secured to said rotatable scale means and having a lower edge conforming to a propeller blade surface of said propeller, at a known radius, said rotatable scale means rotating on a center adapted to coincide with the axis of rotation of the propeller blade, said angular measuring means being independent of the propeller blade contour to thereby indicate the pitch of the propeller blade by the angular displacement of the rotatable scale means relative to the other scale means.

References Cited in the file of this patent

UNITED STATES PATENTS

| | | |
|---|---|---|
| 1,021,797 | Rice | Apr. 2, 1912 |
| 1,597,357 | Godfrey | Aug. 24, 1926 |
| 1,968,837 | Kneip | Aug. 7, 1934 |
| 2,238,782 | Roche | Apr. 15, 1941 |
| 2,470,636 | Moss | May 17, 1949 |
| 2,481,062 | Anderson | Sept. 6, 1949 |

FOREIGN PATENTS

| | | |
|---|---|---|
| 730,983 | Germany | Jan. 30, 1943 |